(No Model.) 3 Sheets—Sheet 1.

T. M. HOVELL.
ANIMAL TRAP.

No. 544,983. Patented Aug. 20, 1895.

Witnesses.
Geo. W. Rea.
Robert Everett.

Inventor.
Thomas M. Hovell.
By James L. Norris.
Atty.

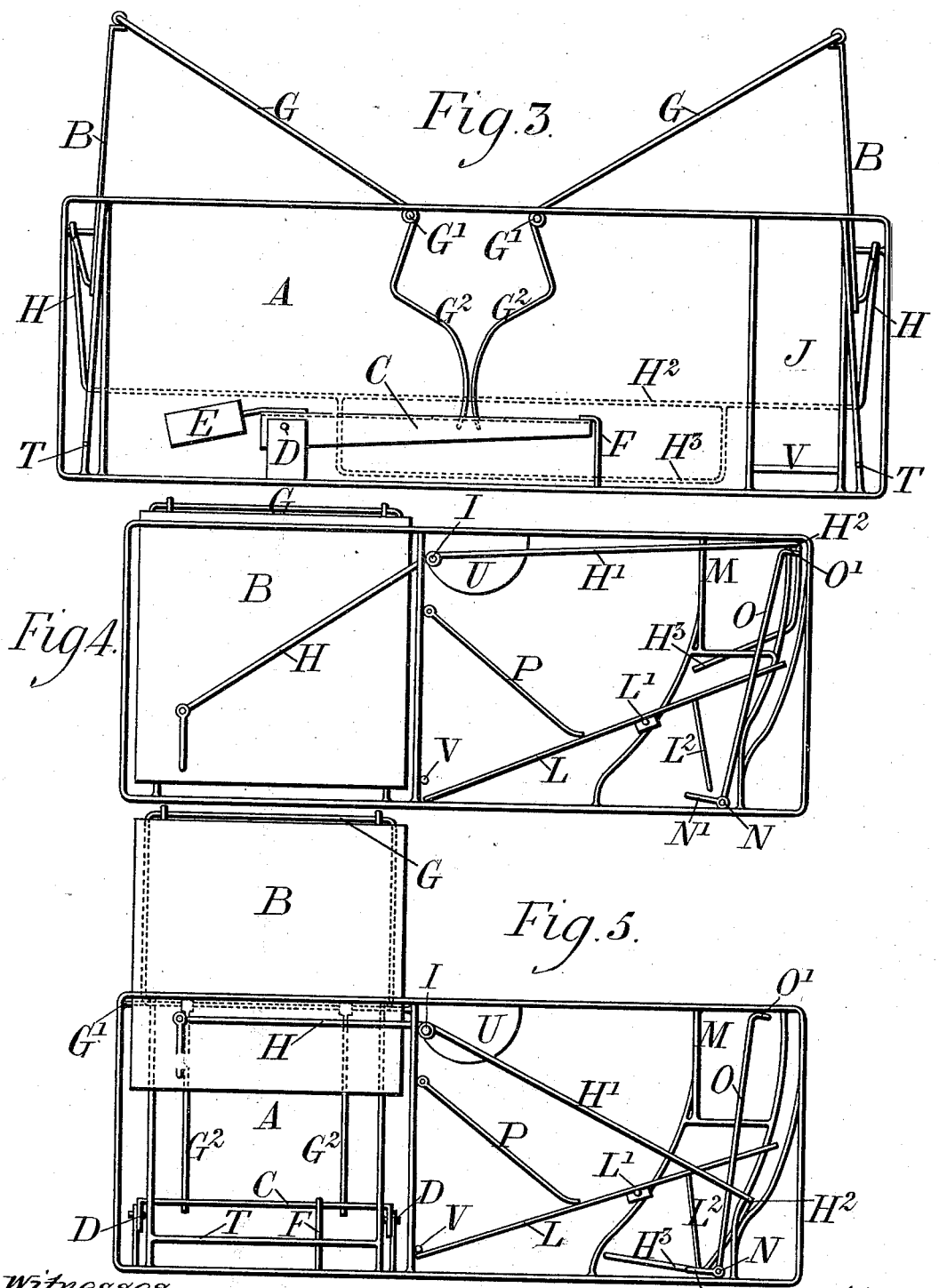

(No Model.) T. M. HOVELL. 3 Sheets—Sheet 3.
ANIMAL TRAP.

No. 544,983. Patented Aug. 20, 1895.

Witnesses.
Geo. W. Rea.
Robt Everett.

Inventor.
Thomas M. Hovell.
By James L. Norris.
Atty.

UNITED STATES PATENT OFFICE.

THOMAS M. HOVELL, OF ELSTREE, ENGLAND.

ANIMAL-TRAP.

SPECIFICATION forming part of Letters Patent No. 544,983, dated August 20, 1895.

Application filed April 22, 1895. Serial No. 546,711. (No model.)

*To all whom it may concern:*

Be it known that I, THOMAS MARK HOVELL, a citizen of England, residing at Boreham Holt, Elstree, in the county of Hertford, England, have invented certain new and useful Improvements in Animal-Traps, of which the following is a specification.

My invention relates to that kind of animal-trap wherein, first, two open doors situated at opposite ends of one compartment of the trap are closed simultaneously by the entrance of an animal in treading on a pivoted platform, while, secondly, the animal in passing into another compartment actuates a device by its weight whereby the doors are opened and set ready for another animal to enter.

I will describe my improved construction of such traps with reference to the accompanying drawings, in which—

Figure 1:
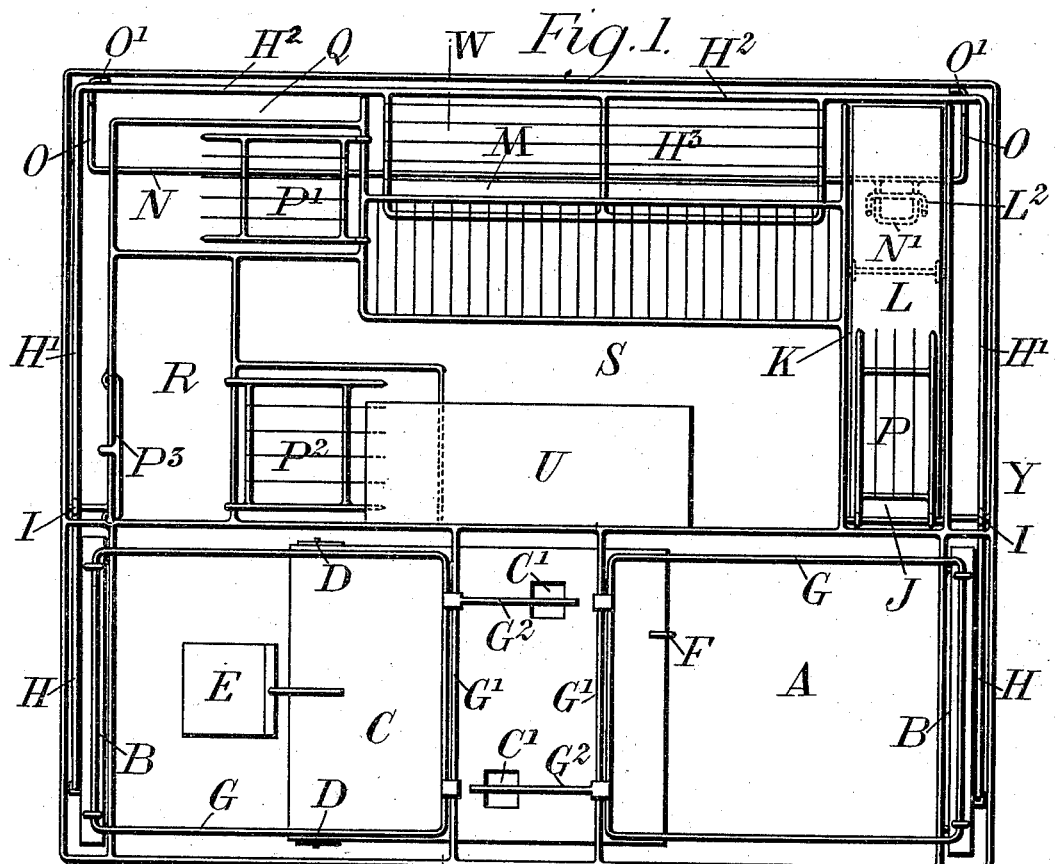
Figures 2, 7, 8:
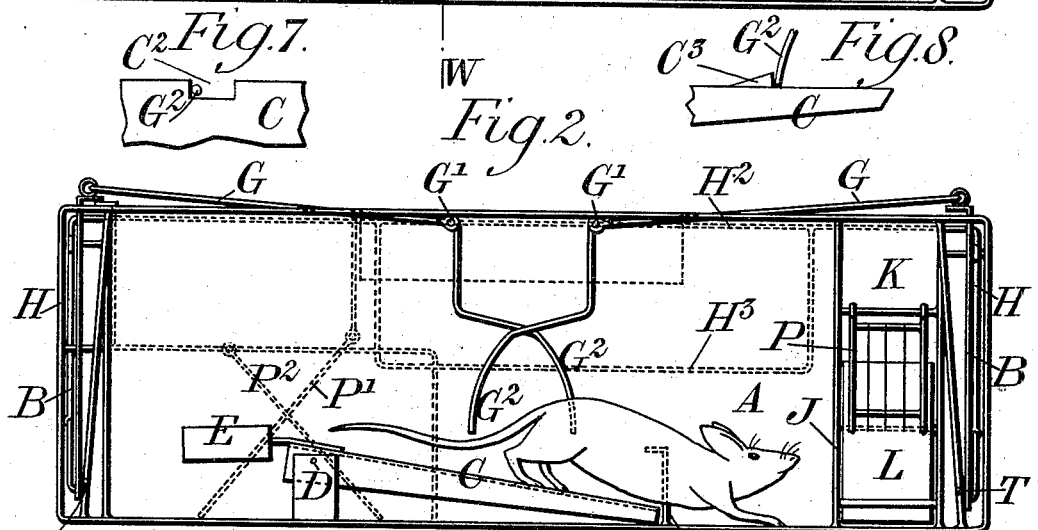
Figure 6:
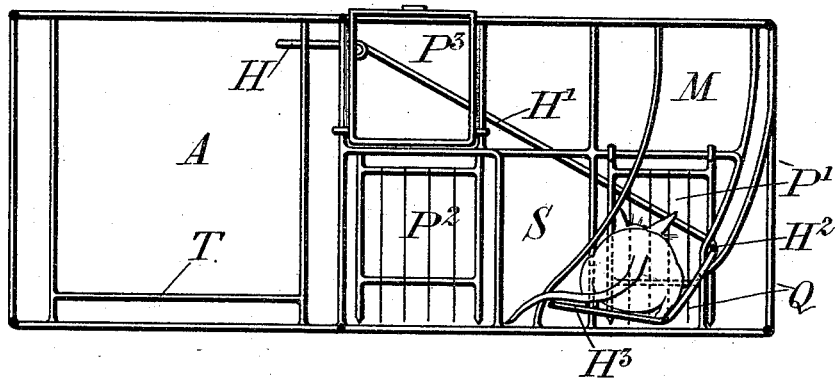

Figure 1 shows a plan with the top of the cage removed. Fig. 2 shows a front elevation with the doors closed. Fig. 3 shows the same view with the doors open. Fig. 4 shows an end view at Y with the doors closed; Fig. 5, the same view with the doors open, and Fig. 6 a cross-section at W W. Figs. 7 and 8 are enlarged details illustrating the engagement between the platform and the door-controlling levers.

The trap, which may either be of wire, as shown, or of other suitable material, has, first, a compartment A, the open ends of which can be closed by doors B B, and it contains a platform or treadle C, pivoted at D, and which is normally held in the raised position shown at Fig. 3 by a counterweight E, which keeps it against a stop F. The platform, when in this position, directly locks the doors in the open position by the following arrangement: The doors are hung at their upper ends from looped levers G, pivoted to a bar G' on the cage, and having bent tails $G^2$ which project downward, so that when the doors are open their ends enter holes C' C' formed in the platform, when this is in the raised position, so that levers G, and consequently the doors, in this position of the platform, are prevented from descending on account of the tails $G^2$ abutting against the one edge of the respective holes C'.

On an animal entering the trap and depressing the platform in endeavoring to reach the bait at U, the tails $G^2$ are liberated from the holes C', and consequently the levers and doors immediately fall into the closed position, as at Figs. 2 and 4. They are locked in this position by means to be presently described.

To the lower parts of the doors B are pivoted the ends of a loop-shaped lever H H' $H^2$, pivoted to the trap at I and extending to the back of the trap, where the two end parts are connected together by the loop part or bar $H^2$, so that by pressing this part of the lever downward the two end parts H H', in turning on their pivots, will raise the doors from the closed to the open position, as shown at Fig. 3 and at the end view, Fig. 5.

It will be seen from Fig. 2 that when the doors B are in the closed position the ends of the tails $G^2$ are situated just above the platform C, so that as the doors rise into the open position the tails $G^2$, in descending, will depress the platform somewhat until they pass the edges of the holes C', when the platform, in rising again, will lock the tails in the holes, as described. It will be obvious that instead of causing the tails $G^2$ to be locked by holes formed in the platform C this may be effected by any equivalent means, such as notches in the side of the platform, as at $C^2$ in the part plan at Fig. 7, or inclined projections, as at $C^3$ in the part elevation at Fig. 8.

The opening of the doors is effected automatically by the animal caught in the trap by the following arrangement: At one end of the compartment A is a side opening J, leading into a passage K, in which is an inclined platform L, pivoted at L' and leading up to a passage M. This passage is partly formed by a platform $H^3$, forming part of the looped lever H H' $H^2$. Fixed to a pivoting-bar N at the bottom of the trap is a catch-lever O, which ordinarily extends up in the slanting position shown at Fig. 4, so that its head O' is situated immediately underneath the bar $H^2$ of the lever H H', when this is in the raised position, with the doors B closed, so that as the catch O prevents the part H' of the lever from descending it effects the locking of the doors in the closed position. On the bar N is fixed a looped finger N', and on the under side of the platform L is a looped bar $L^2$, projecting downward to near the finger N', so that if the upper end of the platform be slightly depressed (the extent of its motion being limited by a stop at V) the bar L² will depress the finger N', thereby turning bar N and catch O into the position at Fig. 5, in which it frees the lever H H', so that the part H' can now move downward for opening the doors.

The action of the above-described devices will be as follows: An animal confined in the compartment A by the closing of the doors, as described, on finding the opening J will pass through the same onto the platform L, pushing open the pivoted gate P, which closes behind him. The weight of the animal will slightly depress the upper end of the platform, thereby bringing the catch O from under the lever H H' H². The animal will then at once enter the passage M and its weight on the platform H³ will depress the part H' of the lever, as at Figs. 5 and 6, thereby raising the doors B, which will be locked in the open position by the platform C, as described. At the bottom of the far end of the passage M is a passage Q, into which the animal will pass from the lowered platform H³, lifting the pivoted gate P', which will close behind it, and, finally, it will pass through another passage R and gate P² into the compartment S. The trap having been thus set by the imprisoned animal, another animal entering will again depress the platform C, causing the doors B to close and the lever H H' H² and platform H³ to rise again into their original position, when the catch O will drop back under the bar H², so as to lock the doors until the second animal has passed through the gate P, whereupon the above-described action will be repeated, and so on till the compartment S is full, whereupon it can be emptied by opening a gate P³. Bars T are provided in front of the doors B for preventing the animals from trying to prize the doors open.

U is a perforated bait-box.

Having thus described the nature of my invention and the best means I know for carrying the same into practical effect, I claim—

1. In an animal trap, the combination of a compartment A, having sliding doors B, at each end, levers G from which the doors are hung and which have tails G², a pivoted platform C held in a raised position by a balance weight and having holes C' or equivalent stops with which the ends of the lever tails G² engage when the doors are open so as to lock them in that position, substantially as described.

2. In an animal trap, the combination with a compartment A, of a vertically sliding door B suspended from a lever G with tail G² adapted to engage with a hole in a pivoted platform C so as to lock the door in the open position, and a rocking double ended lever H H' pivoted at one end to the door while the other end is adapted to be depressed by the weight of an animal so as to raise the door into the open position, substantially as described.

3. In an animal trap, the combination of a compartment A having sliding doors B at each end, levers G from which the doors are hung, a pivoted platform C with means for locking the doors in the open position, a rocking lever H H' H² pivoted to the doors and carrying a platform H³ adapted to be depressed with the lever by the weight of an animal and thereby to raise the doors into the open position substantially as described.

4. In an animal trap, the combination of a compartment A, having sliding doors B at each end, levers G from which the doors are hung a pivoted platform C with means for locking the doors in the open position, a rocking lever H H' H², pivoted to the doors and carrying a platform H³ adapted to be depressed with the lever by the weight of an animal and thereby to raise the doors into the open position, a passage K communicating with compartment A and containing a pivoted inclined platform L leading up to the platform H³, a pivoted catch O for preventing the depression of the lever H H' H² so as to lock the doors in the closed position, and a lever device worked by the depression of platform L by an animal, for withdrawing the catch from the lever H H' H² so as to allow this to descend when the animal passes on to the platform H³ substantially as described.

5. In an animal trap the combination of a compartment A closed by doors B B, a pivoted platform C adapted to lock the doors in the open position and to allow them to close when it is depressed, a rocking double ended lever H H' H² pivoted at one end to the doors and carrying at the other end a platform H³ by the depression of which the doors are raised to the open position, a passage K communicating with compartment A and containing a pivoted inclined platform L, a catch O preventing the depression of lever H H' H², a device operated by the depression of platform L for freeing the lever H H' H² from catch O, passages Q R leading from platform H³ to compartment S, and pivoted gates P P' P² in passages K Q and R for preventing the backward escape of the animal when in the said passages substantially as and for the purposes described.

In testimony whereof I have signed my name to this specification, in the presence of two subscribing witnesses, this 11th day of April, A. D. 1895.

THOMAS M. HOVELL.

Witnesses:
 JNO. P. M. MILLARD,
 GERALD L. SMITH.